Patented Aug. 9, 1932

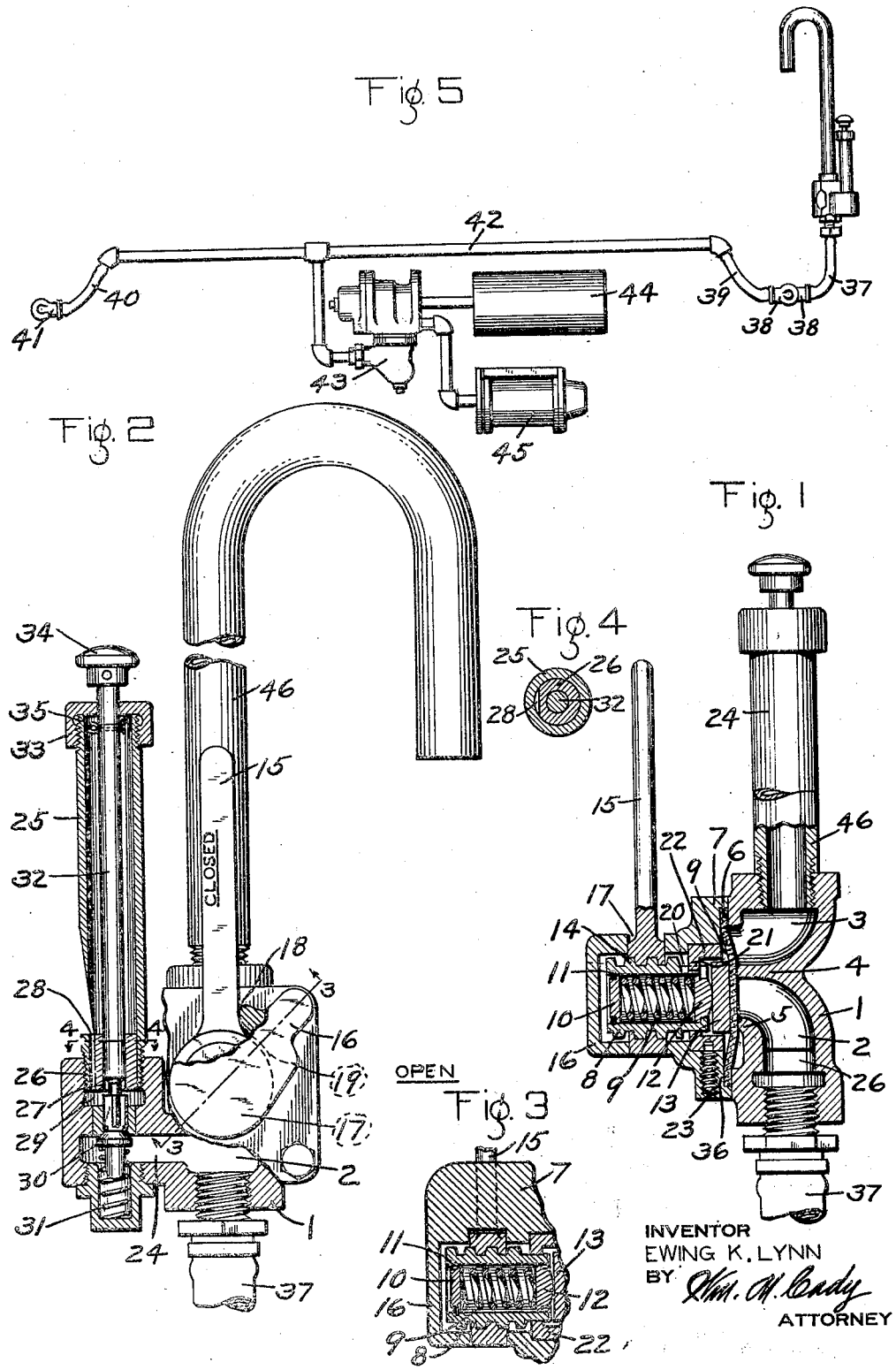

1,870,856

UNITED STATES PATENT OFFICE

EWING K. LYNN, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

CONTROL VALVE DEVICE

Application filed May 24, 1930. Serial No. 455,290.

This invention relates to conductor valve devices and in particular to the type employed at the rear end of a train for effecting an application of the brakes and for producing a warning signal.

The principal object of my invention is to provide an improved valve device of the above character in which reductions in brake pipe pressure can be accurately controlled and in which the possibility of leakage of fluid under pressure to the atmosphere is reduced to a minimum.

Other objects and advantages will be apparent from the following more detailed description of my invention.

In the accompanying drawing; Fig. 1 is a side elevational view, partly in section, of my improved conductor's valve device; Fig. 2 is a side elevational view, partly in section, and taken at right angles to the view shown in Fig. 1; Fig. 3 is a section on the line 3—3 of Fig. 2; Fig. 4 is a section on the line 4—4 of Fig. 2; and Fig. 5 is a diagrammatic view of a fluid pressure brake equipment having my improved conductor's valve connected thereto.

As shown in the drawing, the conductor's valve device may comprise a body portion 1 having an inlet passage 2 and an outlet passage 3 separated by a partition wall 4. An annular seat rib 5 surrounds the outlet face of passage 2, and a flexible diaphragm 6 is adapted to engage said seat rib for controlling communication from passage 2 to passage 3. Said diaphragm is clamped in position on the body portion by a cover portion 7.

Contained in a chamber of the cover portion 7 is a hollow cylindrical member 8, in the bore of which is mounted a coil spring 9. One end of the spring engages a disc 10, which is locked in place by a spring ring 11 engaging in a groove in said member 8. The other end of the spring engages a movable block 12 which engages a follower 13, said follower being in engagement with the diaphragm 6. The member 8 is provided with external screw threads 14 and an operating handle 15 has screw-threaded engagement with the threads 14.

The cover portion 7 is provided with a bonnet 16 which extends over the outer end of the member 8 and forms an opening 17 to permit rotation of the handle 15 on the member 8, the degree of rotation being limited by engagement of said handle with surfaces 18 and 19 of said bonnet. A slot 20 is provided at the inner end of the member 8 for receiving a projection 21 on a bushing 22 secured to the cover portion 7 preferably by a set screw 23. Within the slot, the projection 21 is adapted to be engaged by the member 8 so as to prevent rotational movement of said member, the slot being of sufficient length to permit relative longitudinal movement between the member 8 and the cover 7.

Referring to Fig. 2, a branch passage 24 extends from the passage 2 to the whistle portion of the valve device, said whistle portion being preferably associated with the body 1. The whistle portion may comprise a hollow cylindrical part 25 which, at one end, has screw-threaded engagement with the body 1. Mounted in this end of the cylindrical part 25 is a plug 26 having a central opening 27 therethrough, and a passage 28 formed by cutting a flat face on the plug 26 and which supplies air from a chamber 29 to blow the whistle. A valve 30 contained in the passage 24 is adapted to control communication between the passage 24 and the chamber 29, said valve being subject to the pressure of a spring 31, which urges the valve toward its seat. The valve is provided with a fluted stem, one end of which is adapted to be operatively engaged by the inner end of a push rod 32 which extends longitudinally of the whistle and is slidably mounted in the plug 26 and the cap 33 of the whistle tube 25. The upper end of the push rod extends through the cap and is provided with a push button 34, by means of which the push rod is manually controlled. A pin 35, preferably a cotter pin, is provided in the push rod 32 which, when in engagement with the inner face of the cap 33, limits the upward travel of the push rod and thereby prevents the lower end of said push rod from becoming disengaged from the opening 27 in the plug 26.

Passage 2 in the conductor's valve is adapted to be connected to the usual brake pipe 3 on the rear car of a train by way of the usual hose 37, the couplings 38 and the hose 39, said brake pipe being connected to the brake pipe hose and coupling on the forward car through hose 40 and coupling 41. To the brake pipe 42 is connected a fluid pressure brake of the usual type comprising a triple valve 43, an auxiliary reservoir 44 and a brake cylinder 45. Passage 3 is connected to a vent pipe 46 which is open at one end to the atmosphere and which may be bent into the form of a hook for suspending the conductor's valve device from the platform rail of a car, not shown in the drawing.

In assembling the pressure exerting members within the cover of the conductor's valve device, the screw-threaded end of the handle 15 is inserted in the opening 17 of the cover 7, and is held in full valve open position against the stop 19 while the member 8, containing the spring 9, the disc 10, the spring ring 11, and the movable block 12, is brought into screw-threaded engagement with said handle. Said member is turned until it is in such position that the diaphragm-engaging face of the follower 13 is in substantial alignment with the diaphragm seat 36 in the cover 7. Bushing 22 is then placed in position in such manner as to permit the projection 21 to engage the member 8 in the slot 20, after which, said bushing is secured in position by means of the set screw 23. This method of assembling insures that, when the handle 15 is placed in full valve open position, the diaphragm 6 will permit unrestricted opening between the passages 2 and 3.

It will be noted that the conductor's valve device may be readily maintained, since a bruised or ruptured diaphragm may be replaced by removing merely the cover portion.

In operation, with the brake pipe charged with fluid under pressure in the usual manner, if it is desired to apply the brakes by means of the conductor's valve device, the handle 15 is rotated toward the left from the closed position shown in Fig. 2, in which position the diaphragm 6 is held in engagement with the seat rib 5. This rotation, through the screw-threaded engagement between the handle 15 and the member 8, causes said member to move away from the diaphragm 6 and thereby relieve the tension of the spring 9 sufficiently to permit the diaphragm to be moved away from its seat rib 5 by the pressure of the brake pipe fluid in passage 2. With the diaphragm thus unseated, fluid under pressure is vented from the brake pipe to the atmosphere through the passage 2, the passage 3, and the vent pipe 46, thereby effecting a reduction in brake pipe pressure and an application of the brakes in the usual manner. The flow area of the communication between the passages 2 and 3 may be varied according to the deflection of the diaphragm 6, so that the rate of brake pipe reduction will be correspondingly varied. Accurate control of the degree of deflection of the diaphragm is provided through the screw-threaded engagement between the handle 15 and the member 8.

When the desired reduction in brake pipe pressure has been made, the handle 15 is turned toward its closed position, causing the member 8 to move inwardly and exert pressure against the diaphragm 6 through the spring 9, the movable plate 12, and the follower 13. After the diaphragm 6 is thus deflected into engagement with the seat rib 5, further rotation of the handle acts to compress the spring 9 and press said diaphragm into tight engagement with the seat rib 5, thereby preventing leakage of fluid from the passage 2 to the passage 3. The closing of the conductor's valve device in this manner permits restoration of brake pipe pressure through the operation of the usual feed valve device on the locomotive (not shown).

If it is desired to sound the whistle, the push button 34 is depressed, which causes the push rod 32 to unseat the valve 30 against the pressure of the spring 31 and thereby permit fluid at brake pipe pressure to be supplied to the whistle through the passage 2, the passage 24, the chamber 29, and the passage 28, thereby producing a warning signal in the well known manner.

The warning signal may be discontinued by releasing pressure from the push button 34, which permits the spring 31 to urge the valve 30 to its seat, thereby cutting off the supply of fluid under pressure to the whistle.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a back-up hose adapted to be connected to the brake pipe, of an application valve device connected to said hose and comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm and having external screw-threads, a handle having screw-threaded engagement with said external screw-threads of said member for operating said member, and a spring interposed between said member and said diaphragm for resiliently pressing said diaphragm into engagement with said seat.

2. The combination with a back-up hose adapted to be connected to the brake pipe, of an application valve device connected to said hose and comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm, a handle having screw-threaded engagement with said member for operating said member, a spring interposed between said member and said diaphragm for resiliently pressing said diaphragm into engagement with said seat, and means for preventing rotative movement of said member.

3. The combination with a back-up hose adapted to be connected to the brake pipe, of an application valve device connected to said hose and comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm and having a longitudinal slot, means engaging in said slot for preventing rotative movement of said member, a handle having screw-threaded engagement with said member for operating said member, and a spring interposed between said member and said diaphragm for resiliently pressing said diaphragm into engagement with said seat.

4. The combination with a back-up hose adapted to be connected to the brake pipe, of an application valve device connected to said hose and comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm and having a longitudinal slot, means fixed relative to the casing and engaging in said slot for preventing rotative movement of said member, a handle having screw-threaded engagement with said member for operating said member, and a spring interposed between said member and said diaphragm for resiliently pressing said diaphragm into engagement with said seat.

5. A cock device comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm and having external screw-threads, a handle having screw-threaded engagement with said external screw-threads of said member for operating said member, and a spring interposed between said member and said diaphragm for resiliently pressing said diaphragm into engagement with said seat.

6. A cock device comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm and having external screw threads, a handle having screw-threaded engagement with said external screw threads of said member for operating said member, a spring interposed between said member and said diaphragm for resiliently pressing said diaphragm into engagement with said seat, and means for preventing rotative movement of said member.

7. A cock device comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm and having a longitudinal slot, means engaging in said slot for preventing rotative movement of said member, a handle having screw-threaded engagement with said member for operating said member, and a spring interposed between said member and said diaphragm for resiliently pressing said diaphragm into engagement with said seat.

8. A cock device comprising a casing having an inlet and an outlet passage, a valve seat interposed between said passages, a diaphragm for controlling communication between said passages and adapted in one position to engage said seat for cutting off communication between said passages, a member mounted in said casing for operating said diaphragm and having a longitudinal slot, means fixed relative to the casing and engaging in said slot for preventing rotative movement of said member, a handle having screw-threaded engagement with said member for operating said member, and a spring interposed between said member and said diaphragm for resiliently pressing said diaphragm into engagement with said seat.

In testimony whereof I have hereunto set my hand, this 22nd day of May, 1930.

EWING K. LYNN.